United States Patent
Bergström et al.

(10) Patent No.: US 9,497,007 B2
(45) Date of Patent: Nov. 15, 2016

(54) METHODS OF SENDING FEEDBACK SIGNALING UNDER CARRIER SPECIFIC MEASUREMENT GAPS IN MULTI-CARRIER

(71) Applicant: Telefonaktiebolaget L M Ericsson (publ), Stockholm (SE)

(72) Inventors: Mattias Bergström, Stockholm (SE);
(Continued)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 18 days.

(21) Appl. No.: 14/400,428

(22) PCT Filed: Dec. 11, 2012

(86) PCT No.: PCT/SE2012/051374
§ 371 (c)(1),
(2) Date: Nov. 11, 2014

(87) PCT Pub. No.: WO2013/172757
PCT Pub. Date: Nov. 21, 2013

(65) Prior Publication Data
US 2015/0124728 A1 May 7, 2015

Related U.S. Application Data

(60) Provisional application No. 61/647,399, filed on May 15, 2012.

(51) Int. Cl.
*H04L 5/00* (2006.01)
*H04L 1/16* (2006.01)
*H04L 5/14* (2006.01)

(52) U.S. Cl.
CPC ............. *H04L 5/0053* (2013.01); *H04L 5/001* (2013.01); *H04L 1/1607* (2013.01); *H04L 5/0098* (2013.01); *H04L 5/1469* (2013.01)

(58) Field of Classification Search
CPC .................. H04L 1/1607; H04L 5/001; H04L 5/0053; H04L 5/0098; H04L 5/1469
(Continued)

(56) References Cited

U.S. PATENT DOCUMENTS

2008/0144572 A1* 6/2008 Makhijani ............. H04L 1/1887
370/330
2010/0062765 A1 3/2010 Jung
(Continued)

FOREIGN PATENT DOCUMENTS

EP 2242300 A1 10/2010
EP 2385723 A1 11/2011
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 10)", Technical Specification, 3GPP TS 36.321 V10.5.0, Mar. 1, 2012, pp. 1-54, 3GPP, France.
(Continued)

*Primary Examiner* — Stephen J Clawson
(74) *Attorney, Agent, or Firm* — Patents on Demand, P.A.; Brian K. Buchheit; Scott M. Garrett

(57) ABSTRACT

A UE (30) configured in multi-carrier with at least one secondary cell (SCell) may send feedback signaling to the network when measurement gaps are active, which prevent the UE (30) from communicating on the primary cell (PCell). Criteria, signaling means, and pre-defined rules are described for selecting feedback signaling and for selecting the alternative cell (e.g., suitable SCell) for transmitting the selected feedback signaling to the network node during the
(Continued)

measurement gaps. Similarly, a SCell may be used to receive scheduling information during measurement gaps.

47 Claims, 7 Drawing Sheets

(72) Inventors: Muhammad Kazmi, Bromma (SE); Mikael Wittberg, Uppsala (SE)

(58) Field of Classification Search
USPC .......................................................... 370/329
See application file for complete search history.

(56) References Cited

U.S. PATENT DOCUMENTS

| | | | |
|---|---|---|---|
| 2010/0290420 A1* | 11/2010 | Dalsgaard | H04L 5/006 370/329 |
| 2010/0296488 A1 | 11/2010 | Kuo | |
| 2011/0243111 A1 | 10/2011 | Andgart et al. | |
| 2011/0299486 A1 | 12/2011 | Wu | |
| 2012/0051329 A1 | 3/2012 | Hirano | |
| 2012/0083284 A1* | 4/2012 | Harrison | H04L 1/1692 455/450 |
| 2012/0113876 A1* | 5/2012 | Li | H04L 1/1861 370/280 |
| 2012/0188926 A1* | 7/2012 | Li | H04L 1/1692 370/311 |
| 2012/0300720 A1* | 11/2012 | Gou | H04L 5/001 370/329 |
| 2014/0092785 A1* | 4/2014 | Song | H04L 1/00 370/280 |

FOREIGN PATENT DOCUMENTS

| | | |
|---|---|---|
| WO | 2011142710 A1 | 11/2011 |
| WO | 2012064262 A1 | 5/2012 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 10)", Technical Specification, 3GPP TS 36.331 V10.5.0, Mar. 1, 2012, pp. 1-302, 3GPP, France.

3rd Generation Partnership Project, "3rd Generation Partnership Project; Technical Specification Group Radio Access Network; Radio Resource Control (RRC); Protocol specification (Release 11)", Technical Specification, 3GPP TS 25.331 V11.1.0, Mar. 1, 2012, pp. 1-1911, 3GPP, France.

Huawei, "Considerations on Mobility Measurements for Carrier Aggregation", TSG-RAN Working Group 4 Ad Hoc #2010-01, Sophia Antipolis, FR, Jan. 18, 2010, pp. 1-4, R4-100148, 3GPP.

NTT DOCOMO, "Measurement gap control in CA", 3GPP TSG-RAN WG 2 #69bis, Beijing, China, Apr. 12, 2010, pp. 1-3, R2-102499, resubmission of R2-101547, 3GPP.

TSG-RAN WG4, "[Draft] RAN4 Feedback on RAN2 Identified Open Issues related to MC-HSPA", 3GPP TSG-RAN WG4 Meeting #57, Jacksonville, FL, USA, Nov. 15, 2010, pp. 1-2, Tdoc R4-104508, 3GPP.

3rd Generation Partnership Project, "3rd Generation Partnership Project; Technical Specification Group Radio Access Network; Requirements for support of radio resource management (FDD) (Release 8)", Technical Specification, 3GPP TS 25.133 V8.11.0, Jun. 1, 2010, pp. 1-236, 3GPP, France.

3rd Generation Partnership Project, "3rd Generation Partnership Project; Technical Specification Group Radio Access Network; Physical channels and mapping of transport channels onto physical channels (FDD) (Release 9)", Technical Specification, 3GPP TS 25.211 V9.2.0, Sep. 1, 2010, pp. 1-58, 3GPP, France.

* cited by examiner

| Uplink-Downlink Configuration | Downlink-to-Uplink Switch-point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

*FIG. 2*

| Special Subframe Configuration | Normal cyclic prefix in downlink | | | | Extended cyclic prefix in downlink | | |
|---|---|---|---|---|---|---|---|
| | DwPTS | UpPTS | | DwPTS | UpPTS | | |
| | | Normal cyclic prefix in uplink | Extended cyclic prefix in uplink | | Normal cyclic prefix in uplink | Extended cyclic prefix in uplink | |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | | |
| 8 | $24144 \cdot T_s$ | | | — | | |

FIG. 3

| Gap Pattern Id | Measurement Gap Length (MGL, ms) | Measurement Gap Repetition Period (MGRP, ms) | Minimum available time for inter-frequency and inter-RAT Measurements during 480ms Period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

FIG. 4

METHODS OF SENDING FEEDBACK SIGNALING UNDER CARRIER SPECIFIC MEASUREMENT GAPS IN MULTI-CARRIER

FIELD OF INVENTION

The present invention relates generally to wireless communication networks, and in particular to feedback signaling during measurement gaps in carrier aggregation.

BACKGROUND

Wireless mobile communication networks are ubiquitous in many parts of the world. As technologies advance, improvements in network capacity, speed, bandwidth, latency, flexibility, and overall sophistication continue to improve. This results in a succession of versions, or revisions, of technical specifications for a given protocol or access technology, each version adding capabilities, such as advanced operating modes (e.g., discontinuous operations for power savings), multiple antennas, multiple carriers, different duplex modes, and the like.

One advanced feature of many third-generation wireless communication protocols is the provision for multiple signal carrier frequencies, or "carriers," known in the art as carrier aggregation (CA). By sending and receiving traffic on more than one carrier, networks can dramatically increase the communication bandwidth to suitably-equipped User Equipment (UE). In CA, a primary downlink and uplink carrier are defined for each UE, and one or more secondary carriers (downlink, uplink, or both) may additionally be configured.

In modern wireless networks, optimal conditions are achieved by adaptive operation. That is, parameters such as signal strength, data rate, modulation and coding, and the like, are adaptively tailored to the present state or condition of the network and the air interface. This requires UE to regularly perform measurements of various parameters, such as received signal strength, channel quality, interference, and the like, and report these measurements back to the network. Such measurements are also used for mobility management—such as initiating a handover of a UE from one serving network node to another based on the nodes' relative signal strengths as experienced by the UE. Thus, the feedback of measurements from UE to the network is an important part of network operations. Furthermore, these measurements must ideally be reported at fairly short intervals, since network operating conditions change constantly as the UE move around.

Some UE parameter measurements require the UE to tune to a different frequency than that of its downlink or uplink carrier. Since conventional UEs include circuits implementing only one receiver and one transmitter chain, measurement gaps are defined by most protocol technical specifications. During predetermined measurement gaps, the UE may tune to a different frequency and perform measurements, then retune to the uplink carrier frequency to report the measurements to the network. During the measurement gaps, the UE cannot receive traffic on its downlink carrier, and cannot transmit to the network on its uplink carrier.

UE capable of carrier aggregation (CA) must be able to receive and process (and/or transmit on) two or more carriers at a time. Thus, a CA-capable UE either has a wide bandwidth receiver, for receiving two closely-spaced (in frequency) carriers, or it has two or more receiver chains, each capable of tuning to a different carrier. Some CA-capable UE are even capable of operation with carriers on different Radio Access Technologies (RAT), known as inter-RAT carriers. Most wireless protocols implementing CA specify that all UE measurements are reported to the network on the primary uplink carrier.

While wideband receiver UEs may be able to perform measurements on closely spaced carriers (i.e., intra-band) without measurement gaps on the primary carrier, they may still require measurement gaps to perform measurements on carriers separated from their primary downlink/uplink carriers (inter-band), or carriers in a different RAT (inter-RAT). Some measurements, such obtaining and reporting System Information, can take on the order of seconds, which is a very long duration in the context of modern wireless communication networks. During this time, the UE is "cut off" from the network on its primary downlink/uplink carriers, which can result in significant throughput interruptions.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or delineate the scope of the invention. The sole purpose of this summary is to present some concepts disclosed herein in a simplified form as a prelude to the more detailed description that is presented later.

According to one or more embodiments disclosed herein, a UE configured in multi-carrier with at least one secondary cell (SCell) may send feedback signaling to the network when measurement gaps are active, which prevent the UE from communicating on the primary cell (PCell). Criteria, signaling means, and pre-defined rules are described for selecting feedback signaling and for selecting the alternative cell (e.g., suitable SCell) for transmitting the selected feedback signaling to the network node during the measurement gaps.

One embodiment relates to method of sending feedback signaling by a UE operative in a multi-carrier wireless communication network, the UE being configured with one primary component carrier and one or more secondary component carriers. Feedback signaling is sent to the network on the primary feedback carrier. In a duration in which the UE is unable to send feedback signaling to the network on the primary component carrier, at least some of the feedback signaling is sent to the network on one or more secondary component carriers.

Another embodiment relates to a method of transmitting uplink signaling by a UE operative in a multi-carrier wireless communication network, the UE being configured with two or more component carriers. A configuration to perform a measurement gap on a downlink component carrier is received from the network. During the measurement gap, the UE does not transmit any uplink signaling on an uplink component carrier associated with the downlink component carrier on which the measurement gap is configured.

Yet another embodiment relates to a method of receiving scheduling information by a UE operative in a multi-carrier wireless communication network, the UE being configured with a first scheduling component carrier and at least a second scheduling component carrier. Scheduling information is received from the network on a first scheduling component carrier. In a duration in which the UE is unable to receiving scheduling information from the network on the first scheduling component carrier, scheduling information is received from the network on a second scheduling component carrier.

Still another embodiment relates to a method, by a serving network node operative in a wireless communication network, of receiving feedback signaling from a UE. The UE is configured for operation on one primary component carrier and one or more secondary component carriers. In a duration in which the UE is unable to send feedback signaling to the network on the primary component carrier, at least some of the feedback signaling is received from the UE on one or more secondary component carriers.

Still another embodiment relates to a UE operative in a multi-carrier wireless communication network. The UE includes a transceiver operative to exchange signaling with a network node on at least a primary component carrier and one or more secondary component carriers. The UE further includes memory, and a processor operatively connected to the memory. The processor is further operative to send feedback signaling to the network on the primary feedback carrier; and in a duration in which the UE is unable to send feedback signaling to the network on the primary component carrier, send at least some of the feedback signaling to the network on one or more secondary component carriers.

Still another embodiment relates to a base station operative in a multi-carrier wireless communication network. The base station includes a transceiver operative to exchange signaling with a UE on at least a primary component carrier and one or more secondary component carriers. The base station further includes memory, and a processor operatively connected to the memory. The processor is further operative to configure the UE for operation on one primary component carrier and one or more secondary component carriers; and in a duration in which the UE is unable to send feedback signaling to the network on the primary component carrier, receive at least some of the feedback signaling from the UE on one or more secondary component carriers.

BRIEF DESCRIPTION OF THE DRAWINGS

FIG. 2 is a table of LTE TDD modes.
FIG. 3 is a table of LTE TDD subframe timing.
FIG. 4 is a table of LTE measurement gap modes.

DETAILED DESCRIPTION

Wideband CDMA (WCDMA) with High Speed Packet Access (HSPA) and the Long Term Evolution (LTE) of the Universal Mobile Telecommunications System (UMTS) are both evolving towards multi-carrier systems. A multi-carrier UE, which has multiple receivers or a wide band receiver, is typically able to measure on inter-frequency carriers without gaps. However, such UEs may still require measurement gaps for performing measurements on inter-RAT carriers and also on the additional inter-frequency carriers. For example, in Dual Carrier High Speed Uplink Packet Access (DC-HSUPA), the UE can measure on secondary DL carrier (i.e. inter-frequency), which is adjacent to the primary DL carrier without gaps. But the same UE requires gaps to measure on inter-frequency carriers, which are non-adjacent to the DL primary carrier or are located in another frequency band (e.g. band B) if the UE supports the additional band.

LTE Frame Structure

LTE operates in different duplex modes such as FDD, TDD and half duplex. In LTE, downlink and uplink transmission are based on radio frames of 10 ms duration. There are two radio frame structures in LTE, known as type 1 for FDD and type 2 for TDD. Each radio frame in both FDD and TDD is of 10 ms.

In FDD each subframe is either a downlink subframe or an uplink subframe.

Figure 1:
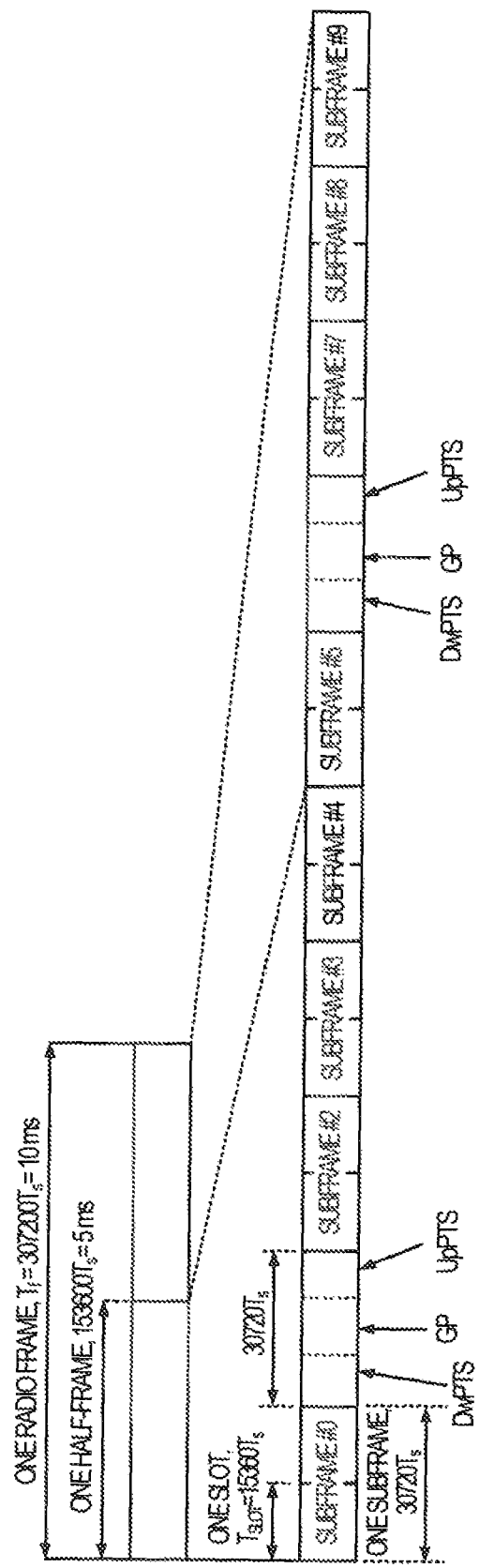
FIG. 1 depicts a LTE frame structure.

In TDD the radio frame consists of two half-frames of 5 ms each. Each half-frame consists of five subframes of length 1 ms. Each subframe is either a downlink subframe, an uplink subframe or a special subframe, giving rise to different TDD configurations. The LTE TDD radio frame is depicted in FIG. 1. The frame length is 10 ms, divided into two 5 ms-slots. Each 5 ms-slot, in turn, consists of 5 sub-frames, each of 1 ms length.

The supported uplink-downlink configurations in LTE TDD are listed in FIG. 2 where, for each subframe in a radio frame, "D" denotes the subframe is reserved for downlink transmissions, "U" denotes the subframe is reserved for uplink transmissions and "S" denotes a special subframe. A special subframe includes three fields: DwPTS, GP, and UpPTS. The length of DwPTS and UpPTS is given in FIG. 3 subject to the total length of DwPTS, GP and UpPTS being equal to 1 ms. Each subframe consists of two slots, each of length 0.5 ms Intra-RAT Carrier Aggregation To enhance peak-rates within a technology, multi-carrier or carrier aggregation (CA) solutions are known. For example, it is possible to use multiple 5 MHz carriers in HSPA to enhance the peak-rate within the HSPA network, and for LTE the aggregation of multiple LTE carriers was introduced in Release 10. Each carrier in multi-carrier or carrier aggregation system is generally termed as a component carrier (CC) or sometimes is also referred to as a cell. The term component carrier (CC) means an individual carrier in a multi-carrier system. The term carrier aggregation (CA) is also called (e.g. interchangeably called) "multi-carrier system," "multi-cell operation," "multi-carrier operation," and "multi-carrier" transmission and/or reception. This means the CA is used for transmission of signaling and data in the uplink and downlink directions. One of the CCs is the primary carrier or primary cell (PCell) or anchor carrier and the remaining ones are called secondary carriers or secondary cells (SCells) or supplementary carriers or supplementary cells. Generally the primary or anchor CC carries the essential UE specific signaling. The primary CC exists in both uplink and downlink CA. The network may assign different primary carriers to different UEs operating in the same sector or cell (i.e., geographic area served by a base station or eNB).

The CCs belonging to the CA may belong to the same frequency band (intra-band CA) or to different frequency band (inter-band CA) or any combination thereof (e.g., 2 CCs in band A and one CC in band B). The inter-band CA comprising of carriers distributed over two bands is also called dual-band-dual-carrier-HSDPA (DB-DC-HSDPA) in HSPA. Furthermore the CCs in intra-band CA may be adjacent or non-adjacent in frequency domain (intra-band non-adjacent CA). A hybrid CA comprising of intra-band adjacent, intra-band non-adjacent and inter-band is also possible.

In HSPA Rel-10, up to four DL carriers can be aggregated, known as 4C-HSDPA where the DL carriers or DL cells may belong to the same frequency band or may be split over two different frequency bands, e.g., three adjacent DL carriers in band I (2.1 GHz) and one DL carrier in band VIII (900 MHz). In HSPA Rel-11, up to eight DL carriers may be aggregated, known as 8C-HSDPA; the DL carriers may be distributed over two or even more bands. In Rel-10 of HSPA and LTE specifications, all the carriers that belong to one frequency band must be adjacent when configured by higher layers (e.g., RRC). However, operation on non-adjacent carriers within the same band can result from the carrier activation/deactivation, which is performed by the lower layers (e.g., Medium Access Control, or MAC). However, in Rel-11, non-adjacent carriers within the same band may be configurable.

In LTE intra-band CA, in principle up to five DL carriers, each of 20 MHz, may be aggregated by the UE; at least the UE requirements exist for two DL carriers, i.e., up to 40 MHz. In LTE inter-band CA, two DL carriers belonging to two different bands can be aggregated by the UE.

Multi-RAT Multi-Carrier Concept

Using carrier aggregation between carriers of different technologies is also referred to as "multi-RAT carrier aggregation" or "multi-RAT-multi-carrier system" or simply "inter-RAT carrier aggregation". For example, the carriers from WCDMA and LTE may be aggregated. Another example is the aggregation of LTE and CDMA2000 carriers. For the sake of clarity, the carrier aggregation within the same technology as described above may be regarded as 'intra-RAT' or simply 'single RAT' CA.

LTE Uplink Control Signaling

It has been agreed that an LTE UE shall only transmit the Physical Uplink Control CHannel (PUCCH) on its PCell. Among other reason, this is because PUCCH transmissions on multiple carriers would require power sharing between carriers, and problems with intermodulation products may arise. Another aspect was to align the behavior of UEs configured with one UL carrier, as well as for UEs configured with multiple UL carriers, to ensure that UE behavior is defined. On the PUCCH, the UE will transmit feedback signaling to the eNB, such as ACK/NACKs, CQI, RI, etc.

SCell Activation and Deactivation

With the concept of SCells, additional bandwidth resources can be configured and deconfigured dynamically. The configuration/deconfiguration of cells are signaled by the eNB and performed with RRC signaling, which is heavy signaling and slow. Since RRC signaling is heavy and slow, the concept of activation/deactivation was introduced for SCells. The eNB has the possibility to deactivate a UE's serving carriers (cells) which the eNB decides that the UE should not use for the moment. Activation/deactivation is performed with MAC signaling which is faster than RRC signaling. The activation/deactivation procedure is described in detail in section 5.13 of 3GPP TS 36.321, "Medium Access Control (MAC) protocol specification," the disclosure of which is incorporated herein by reference. Each SCell is configured with a SCellIndex, which is an identifier or so-called Cell Index which is unique among all serving cells configured for this UE. The PCell always has Cell Index 0 and SCell can have an integer cell index of 1 to 7.

The Rel-10 Activation/Deactivation MAC control element (CE) is defined in section 6.1.3.8 of 3GPP TS 36.321. The Activation/Deactivation MAC CE consists of a single octet containing seven C-fields and one R-field. Each C-field corresponds to a specific SCellindex and indicates whether the specific SCell is activated or deactivated. The UE will ignore all C-fields associated with Cell indices not being configured. The Activation/Deactivation MAC CE always indicates the activation status of all configured SCells, meaning that if the eNB wants to activate one SCell, it must include all configured SCells, setting them to activated or deactivated even if their status has not changed.

If a UE's serving cell is activated, the UE must monitor PDCCH and PDSCH for that serving cell. This implies a wider receiver bandwidth, higher sampling rates, etc., resulting in high power consumption compared to the case where that serving cell was deactivated.

Measurement Gaps

A legacy single-carrier UE (i.e., non-CA capable) typically has a receiver able to receive data only on one carrier frequency, e.g., one receiver comprising of 5 MHz in case of WCDMA or 20 MHz in case of LTE (i.e., one carrier in LTE can be up to 20 MHz). This means such a UE requires measurement gaps to perform inter-frequency and inter-RAT measurements. The measurements may belong to any category. For example, they may be neighbor cell measurements, like PCI identification in LTE or HSPA, ECGI or CGI identification in LTE FDD/TDD or HSPA FDD/TDD, LTE RSRP or RSRQ measurements in LTE or CPICH RSCP, or CPICH Ec/No measurements in WCDMA. Yet other examples are: GSM carrier RSSI measurement, GSM BSIC identification, CDMA2000 measurements e.g. CDMA 2000 1× Pilot Strength, HRPD Pilot Strength, etc.

There may also be positioning related measurements, e.g., RSTD in LTE. The UE may also be able to perform other types of measurements, e.g., measurements for minimization of drive tests (MDT) such as pilot measurements or BCH failure rate, measurements for self organizing network (SON), etc.

During gaps the UE performs measurement on the target frequency or target RAT and therefore it cannot receive the data from the serving cell.

As used herein, the term "Configured Measurement Gap" denotes those subframes that have been configured by the network to be used by the UE to measure on another frequency. As used herein, the term "Measurement Gap" is used in general for all subframes where the UE is not able to receive and/or transmit on a specific frequency. This includes configured measurement gaps, and may in some cases also include subframes that are adjacent to a configured measurement gap, but which can nevertheless not be used for receiving and/or transmitting data due to timing conditions that make it impossible for the UE to immediately adapt its receiver/transmitter to another frequency.

Measurement Gaps in WCDMA

In WCDMA the measurement gaps are known as "compressed mode (CM) patterns." The CM pattern comprises periodic gaps of seven or more slots occurring with certain periodicity. During the gaps, the UE switches from the serving WCDMA carrier to the WCDMA inter-frequency or inter-RAT frequency (e.g., to LTE carrier) for performing the measurement on the target inter-frequency or inter-RAT frequency.

In WCDMA a separate CM pattern is to be activated for performing measurement on each inter-frequency or inter-RAT carrier.

The CM patterns allow the UE to some extent to recover the data lost during the gaps, e.g., by lowering the spreading factor and increasing the BS transmitted power to the UE during the recovery frames.

Measurement Gaps in LTE

In LTE the inter-frequency and inter-RAT measurements are also performed during periodic gaps, which occur with periodicity of 40 ms (pattern #0) or 80 ms (pattern #1). Each gap during which the UE performs inter-frequency and inter-RAT measurements comprises 6 ms. Unlike WCDMA, the loss in data during the gaps cannot be compensated. This is because there is no concept of compressed frames/sub-frames, which exists in WCDMA where the spreading factor can be lowered to recover the loss of data in gaps. This means in LTE the peak data rate will be reduced due to the measurement gaps, where data cannot be transmitted.

Inter-Frequency/Inter-RAT Measurements in CA without Gaps

A CA capable UE (intra-RAT or multi-RAT CA) has a wide band receiver (i.e. in case of intra-band contiguous CA) or multiple receivers (i.e. in case of inter-band CA).

Hence such a UE may also be capable of performing measurements on non-serving carriers without measurement gaps. For example an intra-RAT-intra-band contiguous CA UE may be capable of measuring on inter-frequency without gaps.

It is mandatory for a UE supporting DC-HSUPA to measure on the DL frequency (carrier) associated with the secondary UL frequency (carrier) without compressed mode, as long as the secondary uplink frequency (carrier) is configured. A UE supporting the dual carrier feature might be able to perform measurements without compressed mode on the secondary DL frequency (carrier). Similarly a DB-DC-HSDPA UE may also have the capability to perform measurements without compressed mode on the DL secondary carrier, which belong to the second band jointly supported with the band of the primary DL carrier. In case of 4C-HSDPA, the UE may also have the capability to perform measurements without compressed mode on the second and third DL carriers, which may belong to any of two bands, i.e., band of the primary DL carrier or band jointly supported with the band of the primary DL carrier.

In LTE the CA capable UE is also required to perform measurements on the secondary DL carriers (known as DL secondary cell or DL Scell). The DL Scells may be adjacent to the DL primary carrier (Pcell) in case of intra-band contiguous CA. The DL SCells may belong to another band in case of inter-band non-contiguous CA.

A multi-RAT CA capable UE may also be able to perform inter-RAT measurements without gaps. For example the LTE-WCDMA multi-RAT UE may be able to perform measurements without gaps/compressed mode patterns on the WCDMA carrier when the primary/serving RAT is LTE and on the LTE carrier when the primary/serving RAT is WCDMA.

Inter-Frequency/Inter-RAT Measurements in CA with Gaps

There are two types of gaps for doing measurements: network configurable measurement gaps, e.g., compressed mode gaps in HSPA and measurement gaps in LTE; and UE autonomous gaps, e.g., gaps which are autonomously created by the UE when the UE is requested to read system information of a neighbor cell.

Network Configurable Measurement Gaps

A CA capable UE (intra- or multi-RAT) also has the basic measurement capability of performing measurements on inter-frequency/inter-RAT using measurement gaps.

This means that the network can configure the CA capable UE to perform measurements on inter-frequency using gaps even if such a UE is capable of measuring inter-frequency without gaps. These types of gaps are periodic or repetitive measurement gaps which are configured by the network at the UE. For example in LTE there are two types of measurement gaps. In one type of gap, each gap is of 6 ms and occurs every 40 ms. In the other type of gap, each gap is also of 6 ms, but occurs every 80 ms. FIG. 4 depicts the two network configurable gap pattern configurations supported by the UE in LTE.

The network may even request the UE to perform measurements with and without gaps on the same inter-frequency, e.g., DC-HSUPA UE may be requested to measure on DL secondary carrier during the gaps of the CM pattern and without gaps. For example the network may configure different events for the gap-based and non-gap-based measurements. In this way the network may obtain a large number of measurement statistics and reports, which in turn could be used for the same purpose (e.g., handovers) or for multiple purposes (e.g., handover, load balancing, network planning and optimization, etc.).

Furthermore, the intra-RAT CA capable UE supporting inter-frequency measurements without gaps (e.g. DC-HSUPA or DB-DC-HSDPA or LTE intra-band CA or LTE inter-band CA, etc.) would still need measurement gaps/compressed mode to perform inter-RAT measurements. For example DC-HSUPA UE would require CM patterns to perform measurements such as GSM carrier RSSI on GSM carrier or RSRP/RSRQ on LTE carrier. For example LTE intra-band UE would require measurement gaps to perform measurements such as GSM carrier RSSI on GSM carrier or WCDMA CPICH measurements on the target WCDMA carrier.

UE Autonomous Gaps for SI Reading

In HSPA and LTE the serving cell can request the UE to acquire the system information (SI) of a target cell (carrier). More specifically, the SI is read by the UE to acquire the cell global identifier (CGI) of the target cell, which uniquely identifies a cell.

The UE reads the SI of the target cell (e.g. intra-, inter-frequency or inter-RAT cell) upon receiving an explicit request from the serving network node via RRC signaling, e.g., from RNC in HSPA or eNode B in case of LTE. See 3GPP TS 36.331 "Evolved Universal Terrestrial Radio Access (E-UTRA); Radio Resource Control (RRC); Protocol specification," the disclosure of which is incorporated herein by reference. The acquired SI is then reported to the serving cell. The signaling messages are defined in the relevant HSPA and LTE specifications.

In order to acquire the SI which contains the CGI of the target cell, the UE has to read at least part of the system information (SI) including master information block (MIB) and the relevant system information block (SIB) as described herein below. The terms SI reading/decoding/acquisition, CGI/ECGI reading/decoding/acquisition, CSG SI reading/decoding/acquisition are interchangeably used but have the same or similar meaning.

The reading of SI for the acquisition of CGI is carried out during measurement gaps which are autonomously created by the UE. The number of gaps and their size thus depends upon UE implementation as well as on other factors such as the radio conditions, type of SI to be read, etc. The term autonomous means that the network does not know exactly when the gaps are created. The gaps are created at least in the downlink and in this case the UE cannot receive data. But autonomous gaps may also be created in the uplink, especially when acquiring the SI of the target inter-frequency cell or inter-RAT cell. In this case the UE can neither receive nor transmit data.

In contrast, the normal periodic measurement gaps (compressed mode pattern, transmission gaps, etc.) are used for performing, e.g., mobility measurements such as RSRP/RSRQ. They are configured by the network by sending explicit configuration to the UE. Hence in this case the network precisely knows the location in time of each gap.

The autonomous gaps are needed because the UE cannot receive and/or transmit data in parallel with the reading of the SI of a target cell. The reason is that the simultaneous operation increases complexity, memory requirements, and power consumption. Furthermore, the legacy single carrier UE (i.e. non CA capable) typically has a single receiver for receiving data only on one carrier frequency, e.g., one receiver comprising of 5 MHz in case of WCDMA or 20 MHz in case of LTE (i.e. one carrier in LTE can be up to 20 MHz). This means such a UE needs autonomous gaps for acquiring at least the inter-frequency and inter-RAT SI.

The SI reading may also be used for acquiring additional information beyond CGI, e.g., CSG or hybrid CSG indicator, etc.

In LTE the UE reads the MIB and SIB1 of the target E-UTRAN cell (which can be FDD or TDD) to acquire its CGI (aka ECGI) when the target cell is E-UTRAN intra- or inter-frequency. See 3GPP TS 36.321.

In LTE the MIB is transmitted periodically with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. In LTE the MIB contains basic information such as cell bandwidth, SFN etc.

The LTE SIB1, as well as other SIB messages, is transmitted on DL-SCH. The SIB1 is transmitted with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0. The LTE SIB1 may also indicate whether a change has occurred in the SI messages. The UE is notified about a pending change in the SI by a paging message, from which it will know that the system information will change at the next modification period boundary. The modification period boundaries are defined by SFN values for which SFN mod m=0, where m is the number of radio frames comprising the modification period. The modification period is configured by system information. The SIB1 contains information such as CGI, CSG identity, frequency band indicator, etc.

In HSPA the UE reads the MIB and SIB3 of the target cell UTRAN cell to acquire its CGI (aka Neighbor Cell SI) when the target cell is UTRAN intra- or inter-frequency. See 3GPP TS 36.331. The MIB provides the basic information such as SFN and SIB3 contains the CGI of the target cell.

The procedure for inter-RAT SI acquisition during autonomous gaps is also specified for inter-RAT UTRAN, inter-RAT E-UTRAN, inter-RAT GEM/GERAN, inter-RAT CDMA2000 etc. These are explained below:

In case of inter-RAT UTRAN, the UE served by the E-UTRAN cell reads the MIB and SIB3 of the target UTRAN cell during autonomous gaps to acquire UTRAN cell system information, e.g., UTRA cell CGI.

In case of inter-RAT E-UTRAN, the UE served by the UTRAN cell reads the MIB and SIB1 of the target E-UTRAN cell (which can be FDD or TDD) during autonomous gaps to acquire E-UTRAN cell system information, e.g., E-UTRA cell CGI.

In case of inter-RAT CDMA2000, the UE served by the E-UTRAN cell reads the relevant broadcast information the target CDM2000 cell to acquire CDM2000 cell system information, e.g., CDMA2000 cell CGI. CDMA2000 is a generic term; the target CDMA2000 cell can thus belong to CDMA2000 1× RTT or HRPD systems.

The target cell whose SI can be acquired can be intra-frequency cell, inter-frequency cell or even inter-RAT cell (e.g. UTRAN, GERAN, CDMA2000 or HRPD). There are at least a few well-known scenarios for which the serving cell may request the UE to report the CGI of the target cell. These include verification of CSG cell, establishment of SON ANR, and MDT.

In order to support mobility, the UE is required to identify a number of neighbor cells and report their physical cell identity (PCI) to the serving network node (e.g., serving eNode B in E-UTRAN). The UE may also be requested to report the neighbor cell measurements such as RSRP and/or RSRQ in E-UTRAN or CPICH RSCP and/or CPICH Ec/No in UTRAN or even GERAN carrier RSSI or even pilot strength for CDMA2000/HRPD. In response to the reported UE measurement, the serving network node sends handover command to the UE.

Due to smaller cell sizes in a dense deployment scenarios (e.g., femto cells, restricted small cells like femto closed subscriber group, pico cells, etc.), the PC's are more frequently reused. In order to prevent HO command to a non-allowed home base station (e.g., CSG cell), the serving network node may also request the UE to decode and report the cell global identifier (CGI) of the target cell. This is also known as home inbound mobility. The CGI is unique in the network allowing the network to distinguish between macro BS and home BS or to uniquely identify that the reported cell belongs to CSG or hybrid CSG.

The procedure and the associated requirements for the target cell's CGI reporting are specified in E-UTRAN. One key aspect of the CGI decoding is that it is performed by the UE during the autonomous gaps, which are created by the UE itself. The reason for acquiring the target cell CGI during autonomous gaps stems from the fact that the typical UE implementation is not capable of simultaneously receiving the data from the serving cell and acquiring the target cell's system information, which contains the CGI. Furthermore, the CGI acquisition of inter-frequency or inter-RAT target cell requires the UE to even switch the carrier frequency.

Hence the use of autonomous gaps is inevitable for acquiring the target cell's CGI. The autonomous gaps are created both in uplink and downlink.

The self-organizing network (SON) function in E-UTRAN allows network operators to automatically plan and tune the network parameters and network nodes. The conventional method is based on manual tuning, which consumes enormous amount of time, resources and requires considerable involvement of work force.

Due to network complexity, large number of system parameters, IRAT technologies etc., it is very attractive to have reliable schemes to perform the test of self organization in the network whenever necessary.

An operator can also add or delete a cell or an entire base station (with multiple cells). New cells are added more frequently during an early phase of network deployment. In the later stages an operator can still upgrade the network by adding more carriers or more base stations on the same carrier. It can also add cells related to another technology. This is called the automatic neighbor cell relation (ANR) establishment and is part of the self organizing network (SON). In order to ensure correct establishment of the neighbor cell relation, the serving cell requests the UE to report the CGI of the new target cell, whose PCI is identified and reported to the serving cell. The CGI acquisition requires the UE to read the target cell's system information and is thus carried out by the UE during the autonomous gaps. As in the case of home inbound mobility, the CGI acquisition for ANR purpose also lead to interruption of the data from the serving cell.

The minimization of drive test (MDT) feature has been introduced in LTE and HSPA Rel-10. The MDT feature provides means for reducing the effort for operators when gathering information for the purpose of network planning and optimization. The MDT feature requires that the UEs log or obtain various types of measurements, events, and coverage related information. The logged or collected measurements or relevant information are then sent to the network. This is in contrast to the traditional approach where the operator has to collect similar information by means of the so called drive tests and manual logging. The MDT is described in 3GPP TS 25.331 "Radio Resource Control (RRC); Protocol specification," the disclosure of which is incorporated herein by reference.

The UE can collect the measurements during connected as well as in low activity states e.g. idle state in UTRA/E-UTRA, cell PCH states in UTRA, etc.

The UE can also be configured to report the CGI of the target cells along with other measurements (e.g. RSRP, RSRQ, CPICH measurements, radio link failure report, BCH failure rate, paging channel failure rate, etc.). In connected mode the existing procedures are used to acquire the CGI of the target cells for the purpose of the MDT. In idle mode the UE can be configured to log the cell measurements along with the CGI and report the logged measurements to the network at suitable occasion (e.g., when UE goes to connected mode). One key aspect that distinguishes the normal CGI reporting is that in case of MDT, the acquired CGI of the target cells are acquired by the MDT functionality, e.g., MDT node which can be a logical or physical node. The MDT node can use the acquired CGI for network planning and optimizing of the network.

The CGI for MDT purpose is also acquired during the autonomous gaps as in case of CSG inbound mobility or SON ANR.

The SI reading requirements in E-UTRAN are specified or being specified for the following scenarios: Intra-frequency ECGI reporting; Inter-frequency ECGI reporting; and Inter-RAT UTRAN CGI reporting.

The UE is required to report the E-UTRA intra-frequency ECGI within about 150 ms from a target intra-frequency cell provided its SINR is at least −6 dB or higher. During the acquisition of the target cell's ECGI on the serving carrier frequency, the UE is allowed to create autonomous gaps in the downlink and uplink for reading target cell's SI. Under continuous allocation, the UE is required to transmit certain number of ACK/NACK on the uplink to ensure that the UE does not create excessive gaps.

The UE is required to report the E-UTRA inter-frequency ECGI also within about 150 ms from a target inter-frequency cell, provided its SINR is at least −4 dB or higher. During the acquisition of the target cell's ECGI on the serving carrier frequency, the UE is allowed to create autonomous gaps in the downlink and uplink for reading target cell's SI. This causes the UE to interrupt downlink reception and uplink transmission in the serving cell. Under continuous allocation the UE is also required to transmit certain number of ACK/NACK on the uplink to ensure that the UE does not create excessive gaps.

In UTRAN, the target UTRA cell's CGI acquisition is much longer, e.g., more than one second depending upon the periodicity of the SIB3, which contains the CGI. Furthermore, due to the autonomous gaps created by the UE to acquire the target cell's CGI, the aggregate interruption of the data transmission and reception from the serving cell can be 600 ms or longer.

In case of inter-RAT UTRAN, the target UTRA cell's CGI acquisition may take up to two seconds. The aggregate interruption of the data transmission and reception from the serving cell can be up to one second or longer.

Uplink Scheduling in LTE

When the UE has UL data to transmit it will trigger a Scheduling Request (SR). Whenever a SR is pending the UE will send a SR on the PUCCH on those resources it has configured for sending SRs, given that the timer sr-Prohibit-Timer is not running. That timer is used to avoid sending SRs too frequently. The timer is started every time the UE sends a SR, and the UE will wait at least until sr-Prohibit-Timer has expired before sending another SR. A SR will be pending until either all data in the UL buffer is transmitted or the UE sends a Buffer Status Report (BSR) to the network. The UE is configured with a maximum number of SRs which shall be sent. If the UE has no PUCCH resources configured for sending SRs, it will trigger a random access procedure. If the UE has sent a number of SRs, given by the parameter dsr-TransMax, without either emptying the UL buffer or sending a BSR, the UE will, among other things, cancel all pending SRs, release the PUCCH and perform a RA procedure.

The eNB will perform the scheduling of the UEs and decide which time-frequency resources shall be used by which UE. If a UE got scheduled by the eNB, the eNB will inform the UE of this by sending an UL grant telling the UE which resources to use, i.e., on which of the UE's serving cell the UE shall transmit the UL data.

Downlink Scheduling in LTE

When DL data for a UE arrives in the network, the network will perform scheduling of this data. It will select on which time-frequency resources the data shall be transmitted on to the UE. The eNB will send a DL assignment to the UE indicating on which time-frequency resources on which cell the data is scheduled on.

Upon reception of the DL signal, the UE will decode the DL assignments to see if the eNB has scheduled the UE. If the UE finds a DL assignment which matches one if its identifiers, it will decode the message as described in the DL assignment.

Problems with Measurement Gaps

A CA UE, when configured with SCell in the downlink, can receive data and/or control information on PCell and SCell simultaneously. Similarly, the CA UE, when configured with SCell in the uplink, can transmit data and/or control information on PCell and SCell simultaneously. An LTE CA capable UE sends feedback signaling on the PCell; this includes feedback signaling for SCells as well. In the prior art, the UE may create the measurement gaps (network configurable gaps and UE autonomous gaps) on both PCell and SCell(s). This is because there is no means (signaling or pre-defined rules) in the current specification to indicate to the UE whether the gaps should be created on a specific carrier (i.e., on PCell or SCell or both).

It is known in the art that the network can indicate whether the gaps should be created on a specific carrier; however, the solution is not specified for LTE. Therefore when measurement gaps are used, the reception and transmission of data and control information will be affected on PCell and SCell in uplink and downlink during the gaps. The gaps are created in both uplink and downlink. However, consider that it is specified that the gaps are created on a specific cell, e.g., PCell. For example ACK/NACKs for DL receptions on a SCell is transmitted on the PCell in the uplink and therefore, if a measurement gap is performed on the PCell, the ACK/NACKs for that SCell's DL reception will not be sent, and DL is thereby muted. This results in an unnecessary throughput loss. The UE autonomous measurement gaps for reading system information (e.g. inter-RAT UTRA FDD SI) might be up to 2 seconds long. This is a very long time in the context of modern wireless communication networks.

Currently, the UE also will not be able to receive scheduling information on a cell while it is unavailable, for example, due to a measurement gap on a cell which carries the scheduling information.

According to embodiments of the present invention, feedback signaling transmission is enabled on an active, alternative, serving cell (referred to herein as backup feedback cell) when the serving cell which normally is used by the UE for feedback signaling (referred to herein as the normal feedback cell) is unavailable. One example of such a situation is when the UE creates or is configured to create measurement gaps on the PCell for performing one or more measurements (e.g. RSRP, RSRQ, CPICH measurements, CGI acquisition, etc.) while it has one or more SCells which are active, but on which no measurement gaps are created or configured.

Sending Feedback Signaling on an Available Alternative Cell

According to one embodiment the UE sends feedback signaling on a backup feedback serving cell when a measurement gap is performed on the normal feedback cell. For example, if the UE is currently performing a measurement by creating measurement gaps on the PCell, which is where PUCCH usually is transmitted which normally carries feedback signaling, the UE is configured to instead send feedback signaling on an active SCell in the uplink. In this example the normal feedback cell is PCell and backup or alternative feedback cell is a SCell.

The feedback signaling may comprise of any one or more of: channel state information (CSI), measurement results of downlink measurements, measurement results of uplink measurements, buffer status, HARQ related feedback, antenna related feedback information, request for grants or allocation, indication related to satisfaction about the current allocation, etc. Examples of CSI are CQI, PMI, RI, SNR, SINR, BLER etc. Examples of uplink measurements are uplink transmit power, power headroom (e.g. difference between UE max power and estimated or calculated power in dB scale) etc. Examples of HARQ related information is ACK/NACK related to data blocks received at the UE receiver from the transmitter. Antenna related information can be pre-coding matrix indicator (PMI), pre-coding indicator (PCI), rank indicator (RI), number of recommended antennas, number of recommended data beams or steams, etc. An example of buffer status is the amount of traffic in the buffer for uplink transmission. More specifically the said feedback signaling could for example be CQI, rank indicator (RI), pre-coding matrix indicator (PMI), ACK/NACKs, power headroom reports (PHR), etc.

One way for sending the feedback on a backup feedback cell is to multiplex the feedback signaling with other UL transmissions on the backup feedback cell. For example the feedback signaling can be multiplexed with UL data transmission on PUSCH. This requires that there are other UL transmissions on the backup feedback cell with which the feedback signaling can be multiplexed. Alternatively, the UE sends only the feedback signaling, i.e., without multiplexing it with other UL transmissions. The network could send an UL grant for the backup feedback cell when the network expects that the UE has feedback signaling to transmit. The network is expected to know when the UE will send certain feedback signaling, for example ACK/NACKs, CSI reports, measurements etc., in which case the network can send an UL grant to the UE on the backup feedback cell. The grant can be sent a priori, e.g., N subframes prior to the start of the gaps; for example N can be between 1-5.

Another alternative for sending the feedback signaling on the backup feedback cell is to send it on the PUCCH on that cell. The UE would then need to have a PUCCH configuration for that cell which would have been configured by the network.

In this case all feedback signaling is sent on an alternative cell. There are three alternatives to enable UE to send the feedback signaling to the network node on an alternative feedback cell: based on a pre-defined rule; based on network configuration; and based on UE autonomous decision.

In the case of a pre-defined rule, it can be pre-defined that when the UE cannot transmit feedback signaling in subframe(s) during or after the measurement gaps on certain cell (e.g. PCell) then the UE sends its feedback signaling on another cell (e.g. SCell) on which the UE is allowed to transmit in subframe(s) after the measurement gaps. The cell on which the UE sends the feedback signaling may also be pre-defined, e.g., first SCell. It may also be pre-defined that this is allowed only when UE operates in certain carrier aggregation types, e.g., in inter-band CA, intra-band non-contiguous carrier aggregation, etc. It may also be pre-defined that this is allowed only when UE operates in radio transceiver modes or when configured with certain receiver architecture, e.g., when UE has independent receiver and/or transmitter for each cell used in carrier aggregation.

In the case of network configuration, the serving network node (e.g., eNode B) indicates or configures the UE that when the UE cannot transmit feedback signaling in subframe(s) during or after the measurement gaps on certain cell (e.g., PCell) then the UE sends its feedback signaling on another cell (e.g., SCell) on which the UE is allowed to transmit in subframe(s) after the measurement gaps. The network node may also indicate the cell on which the UE sends the feedback signaling, e.g., a specific SCell. The network may also pre-configure the UE with this information, e.g., at the time of configuring gaps and/or when setting up SCell(s). The network may also be allowed to configure the UE to send the feedback signaling on alternative cell only when UE is configured with a specific type of carrier aggregation types, e.g., in inter-band CA, intra-band non-contiguous carrier aggregation, etc. The network may also be allowed to configure the UE to send the feedback signaling on alternative cell only when the UE operates in certain radio transceiver modes or when configured with certain receiver architecture, e.g., when UE has independent receiver and/or transmitter for each cell used in carrier aggregation.

In the case of UE autonomous decision, the UE may decide itself to send the feedback signaling on an alternative available cell provided the UE has valid grant for uplink transmission on this cell or has a valid PUCCH configuration. However in this case the UE may also indicate or pre-warn the network that it may send the feedback information on an alternative cell and also indicate the cell on which the said information will be sent.

Selectively Sending Feedback Signaling on the Backup Feedback Cell

According to one embodiment a selection of which signaling should be carried on the backup feedback cell is made. The backup feedback cell herein refers to a cell on which the UE, when configured with at least one SCell, is allowed to transmit in the uplink while it is not allowed to transmit in the uplink on another cell during the measurement gaps. The result is that at least part of the feedback signaling or related information cannot be sent by the UE to the network in subframes during the measurement gap. The other cell generally carries the feedback signaling (e.g., HARQ A/N, CSI, UE measurement reports, buffer status etc.) from the UE to the network node (e.g., eNode B). As stated earlier the other cell is generally a PCell in the uplink. Typically the feedback signaling on uplink PCell can be sent on a control channel (e.g., PUCCH) or multiplexed with data on data channel (e.g., PUSCH) or partly on the control channel and data channel. Another example of feedback signaling is signals transmitted by the UE in a special subframe in TDD, e.g., UpPTS, random access, etc.

In some scenarios only a subset of the feedback signaling sent on the normal feedback cell might be sent on the backup feedback cell when the normal feedback cell is not available. The feedback signaling which should be sent on the backup feedback cell can be decided based on predefined rules, selected by the UE or selected by the eNB and will be described in greater detail herein.

Feedback Signaling Selection Based on Predefined Rules

Which set of feedback signaling should be sent on the backup feedback cell can be determined from a set of predefined rules. These rules are known both to the UE and the network and therefore no signaling is needed between the two, which is beneficial since additional load, complexity, and delay are avoided. One rule can be that the UE sends feedback signaling in the order of a priority level. For example the feedback signaling which has higher priority will be sent first compared to the other, lower priority feedback signaling. The priority level can be pre-defined. For example ACK/NACK, CSI, uplink measurements, buffer status may be assigned or pre-assigned priority levels 1, 2, 3 and 4 respectively, where priority level 1 is highest and 4 is lowest. For example if there is ACK/NACK to send then the UE first sends ACK/NACK on the backup feedback cell. As another example of the pre-defined rule, the UE may only send certain specific type of feedback signaling on backup/alternative cell. For example it may be predefined that the UE shall only send ACK/NACKs but not any other feedback signaling.

The predefined rules might also be different depending on the reason for the normal feedback cell being unavailable. More specifically, the type of feedback signaling to be sent on the backup cell may also be linked to the type of measurement gaps: network configured or UE autonomous gaps. For example if the UE is performing measurement using an autonomous measurement gap on the normal feedback cell (e.g., PCell) the UE shall send one set of feedback signaling but if the UE is performing a periodic measurement gap, the UE might send another set of feedback signaling. One reason for having different sets of feedback signaling in these cases could be that the periodic measurement gap is shorter than the autonomous measurement gap and it might, during the periodic measurement gap, be possible to cope with a smaller set of feedback signaling. The type of feedback signaling to be sent on the backup cell may also be linked to the characteristics of the UE autonomous gaps. Examples of characteristics are time duration over which the UE autonomous gaps are created (e.g. time to identify CGI of a cell as per pre-defined requirements), type of RAT on which the SI acquisition measurement is done, etc. For example, in case the UE autonomous gaps are for acquiring the CGI of the UTRA cell (e.g. WCDMA) then the gaps are very long up to two seconds. In this case it is more crucial that the UE sends ACK/NACK rather than CSI. Therefore such a rule can be pre-defined in the standard.

UE Based Selection of Feedback Signaling

According one embodiment the set of feedback signaling sent on the backup feedback cell can be determined by the UE and signaled to the network.

In one embodiment the UE always sends all feedback signaling on the backup feedback cell if there are enough resources to transmit the signaling to the network. However the UE may also send a selected set of feedback signaling based on one or more selection criteria.

In one embodiment the contents of the feedback signaling can change depending on certain information related to measurement known to the UE. Examples are channel quality of the activated alternative serving cells, buffer status, etc. If, for example, the UE finds that the buffer status is small it might not send CSI reports while in a large buffer status situation the UE might send CSI reports. The UE may also decide to send part of CSI measurement reports e.g. only CQI and not RI or PMI.

Also parameters characterizing measurement gap and/or type of measurement gap may also be considered by the UE when selecting the feedback signaling. For example the UE may consider the length of the measurement gap in a measurement gap pattern, periodicity of gaps, whether the gaps are configured by the network or autonomously by the UE itself (e.g. for reading SI of a cell) as input for the decision regarding selection of the feedback signaling. For example, during a short measurement gap the UE might judge that signaling of ACK/NACKs will be enough and other signaling can be excluded.

Network Based Selection of Feedback Signaling

According to one embodiment the set of feedback signaling sent on the backup feedback cell by the UE can be determined by the network and indicated to the UE. The network may also indicate to the UE the backup feedback cell on which the UE should send the feedback signaling.

The selection of the feedback signaling can be based on one or more criteria used by the network node. For example the contents of the feedback signaling to be selected by the network node may depend on certain information known to the network such as channel quality, load situation on the UE's serving cells, interference scenario, etc. If, for example, the network finds that the load is high in the serving cells and the network cannot schedule the UE frequently and in which case the CSI reports (e.g. CQI reports, PMI, RI etc.) will be less valuable to the network, However A/N feedback may still be more useful. Therefore in this example the network node could configure the UE not to send CSI reports. However it may request the UE to send A/N.

Also parameters characterizing measurement gap and/or type of measurement gap may also be considered by the network node when selecting the feedback signaling. For example the network node may consider the length of the measurement gap in a measurement gap pattern, periodicity of gaps, whether the gaps are configured by the network or are autonomously created by the UE (e.g. for reading SI of a cell) as input for the decision regarding selection of the feedback signaling. For example, during a short measurement gap the network might judge that signaling of ACK/NACKs will be enough and other signaling can be excluded.

Selection of Alternative Serving Cell(s) to be Used for Feedback Signaling

According one embodiment a selection of which active alternative serving cell(s) should be used for the feedback signaling is made, i.e., the backup feedback cell on which the UE sends the feedback signaling during the measurement gap. In a situation where a UE has multiple potential backup feedback serving cells when the normal feedback cell is unavailable, then one (or more) of those serving cells should be selected to be used for feedback signaling.

Selection of Alternative Serving Cell(s) Based on Predefined Rules

The backup feedback cell(s) to be utilized may be selected according to a set of pre-defined rules. If predefined rules are used to select the backup feedback cell, one benefit is that signaling between the UE and the network is not needed as the predefined rules would be known to both the UE and the eNB.

In various embodiments, such predefined rules can be based on the following parameters:

Bandwidth of alternative cells—This rule is based on the bandwidth of the alternative serving cells. An example rule taking bandwidth as input to the selection is that the available serving cell with the largest bandwidth is used for feedback signaling. A benefit with selecting the cell with the larges bandwidth for feedback signaling is that the UE uses the serving cell which has most bandwidth resources and therefore could, in theory, carry most traffic. Another example is that the cell with the smallest bandwidth is used as backup feedback cell.

Cell index—This rule is based on the cell index of the alternative serving cells. An example rule taking cell index as input to the selection is that the available cell with the highest cell index is used for feedback signaling. Another example is that the available cell with the lowest cell index is used as backup feedback cell. Because the cell index of a serving cell does not have any correlation to the characteristics of the cell, this rule can also be considered as a random cell selection rule.

Carrier frequency—This rule is based on the carrier frequency of the alternative serving cells. An example rule taking carrier frequency as input to the selection is that the available cell with the lowest carrier frequency is used for feedback signaling. A benefit with selecting the cell with the lowest carrier frequency for feedback signaling is that the UE uses the serving cell which, in general, has the highest path gain, as path gain is higher at low carrier frequencies. With high path gain the transmission will be more reliable and the network node will be able to receive it more easily (e.g. with fewer errors, with less uplink power etc.).

Radio conditions—A cell whose radio conditions (e.g., received SINR, SNR, BLER etc. at the eNode B) is above a threshold is selected. In case more than one cell meets the criteria then the UE may decide itself or select the one with best quality. This will ensure that the signaling is received without error or without minimum errors.

Cell load—A cell on which there is least amount of data to be transmitted is selected for sending the feedback signaling. This will distribute load of uplink transmission on different cells.

Association with feedback signaling type—It may also be pre-defined that the cell on which the feedback signaling is to be sent depends upon the type and/or contents of feedback signaling. For example A/N and CSI may be sent on different cells—e.g. A/N on cell which has best radio conditions, and CSI on a cell which has second best radio conditions.

Size of available grant—It may also be pre-defined that the cell on which the feedback signaling is to be sent by the UE depends upon the available grant for uplink transmission. For example a cell which has largest grant may be used by the UE for transmitting the feedback signaling to the network.

UE Based Selection of Alternative Serving Cell(s)

In one embodiment, the alternative serving cell(s) on which the UE transmits the feedback signaling is selected by the UE. The UE autonomously select the cell especially in case more than one cell is available for transmission in the uplink during the measurement gap. For example, the UE can use suitable criteria to select a cell if there is more than one cell. Examples of criteria are channel quality, available grant, amount of data transmitted on available cells.

In one embodiment the UE selects a cell for which grant is available from the network. In another embodiment the UE selects a cell for which largest grant is available. In yet another embodiment the UE selects a cell for which sufficient grant is available to send the signaling and the radio conditions are favorable, e.g., expected received SINR at the network node is above a threshold. The cell on which the feedback signaling is sent may also be based on pre-defined rule, e.g., the cell whose UL quality is the best and/or for which network has provided the highest grant for uplink transmission.

Network Based Selection of Alternative Serving Cell(s)

In one embodiment, the alternative serving cell(s) which the UE transmits the feedback signaling is selected by a network node. The network node can make this selection based on one or more criteria. These criteria can be any one or combinations of criteria above with respect to network selection of the feedback signaling to be sent. For example the selection of the cell can be based on information related to radio conditions, cell load, number of active UEs per cell or interference situation of the different alternative cells. For example, the cell may be selected such that when sending the feedback signaling load of the cells is distributed, balanced, or interference is reduced. After performing the selection the network signals this to the UE.

The information related to the selected cell is then sent to the UE, which uses the received information when sending the feedback signaling on the indicated cell after the measurement gap. In one example the UE is informed using RRC signaling at a suitable occasion, e.g., when configuring the measurement gap, when configuring SCell, at the call setup, during a call or a session etc. In another example the network could also perform the selection by having an indicator flag in the UL transmission grant (e.g., in MAC CE command or on a control channel in DL) indicating on which serving cells the UE should send the feedback. The UE would when receiving a grant with such an indicator know which serving cell the feedback signaling should be sent on.

Combined Selection of Alternative Serving Cell(s)

In one or more embodiments, a combination of the above selection methods are used and is a predefined prioritization of the selection methods is established giving precedence to one selection method over another.

For example, if neither the UE nor the network has selected which cell should be used for sending the feedback signaling, a set of predefined rules will be used. If the channel quality of the selected carrier is reduced, the UE might then select an alternative serving cell other than the one selected based on the predefined rules, and then inform the network. If at a later point in time the network identifies that the cell which the UE currently uses for feedback signaling is highly loaded, the network might select another alternative cell and informs the UE of this.

An alternative of this embodiment is that if the selected feedback cell(s) does not get an UL grant while other serving cell(s) gets an UL grant(s), the UE will select one of the cells with a grant to be the backup feedback cell. The rules described above regarding backup feedback cell selection can be applied to the granted cells. The UE would apply the predefined rule only on the granted serving cells, or if the UE or network has selecting one (or more) of the granted serving cells. For example, if the UE is configured with cell 2, cell 3 and cell 5, and only one backup feedback cell is used which, according the a predefined rule, shall be the active serving cell with the lowest cell index, then cell 2 would be selected. However, if the UE only gets grants for cell 3 and cell 5, then the UE would, in this embodiment, select cell 3.

Representative Embodiment

Figure 5:
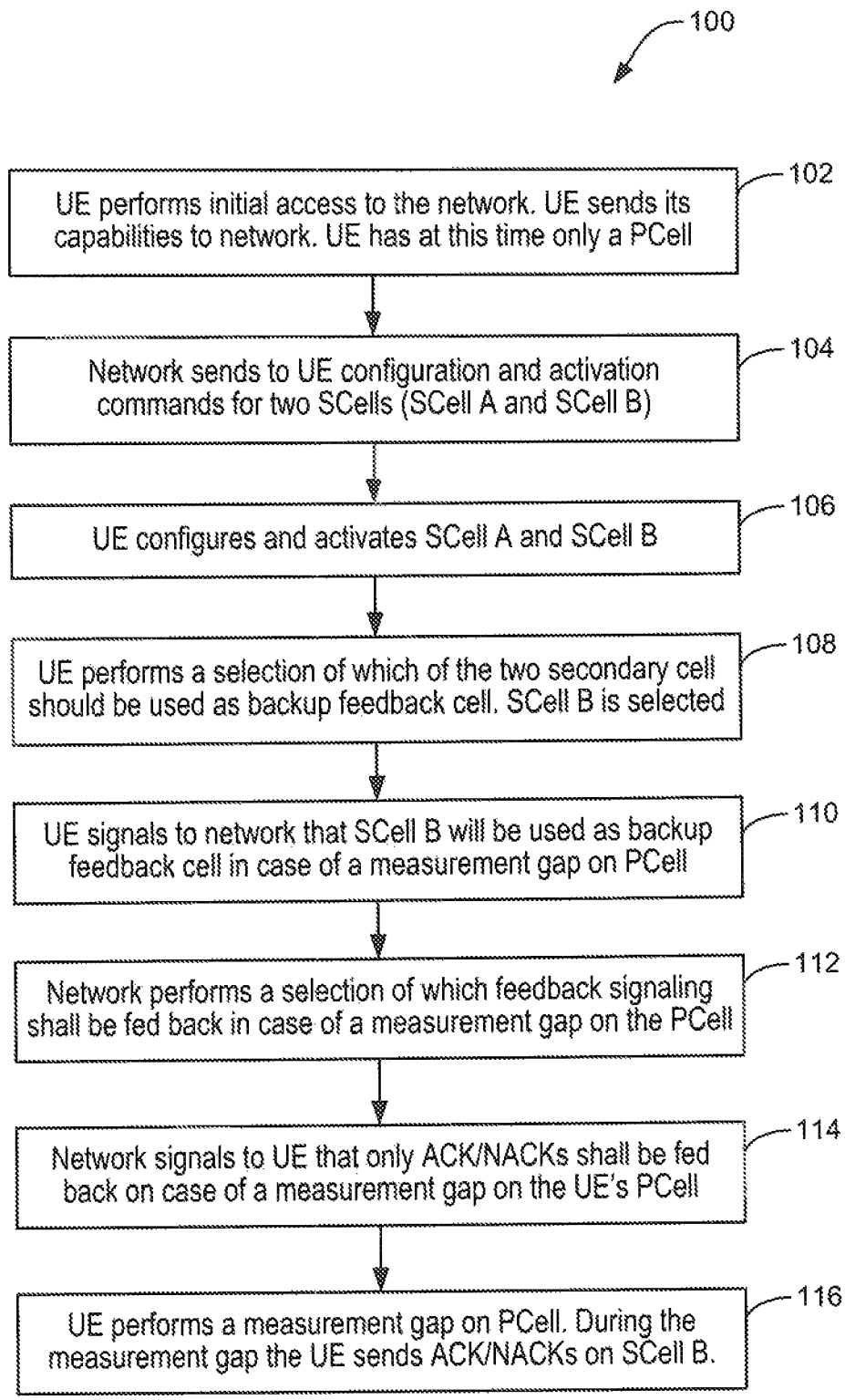
FIG. 5 is a flow diagram of one example of operating a CA-capable UE in LTE.

FIG. 5 depicts a flow chart of a method 100 of operating a UE according to one representative embodiment. This method provides one example of operation of a CA-capable UE in an LTE environment, with some decisions being taken by the UE and others by the network.

Initially, the UE accesses the network, as is conventionally known. The UE is configured with a PCell (block 102).

The network configures the UE for two additional cells: SCell A and SCell B (block 104) on the RRC layer, which the UE activates (block 106) on the MAC layer.

The UE selects SCell B as backup feedback cell (block 108), for example by applying the criteria described herein regarding backup feedback cell selection. In other embodiments, the backup feedback cell may be selected by applying pre-defined rules, or it may be configured by the network. The UE informs the network that SCell B is the backup feedback cell (block 110). In embodiments in which the backup feedback cell selection is made according to pre-defined rules or configured by the network, this step would not be necessary.

The network determines which feedback signaling shall be fed back in the case of the inability of the UE to utilize its PCell, e.g., due to performing a measurement gap (block 112). This determination may be done by applying the criteria described herein regarding backup feedback signaling selection. In other embodiments, the UE may make this determination, or it may be determined by the application of pre-defined rules. In this case, as one example, the network determines only ACK/NACK should be fed back, and informs the UE of this (block 114).

The UE then performs a measurement gap on PCell. During this time, the UE sends ACK/NACK on SCell B (block 116).

Uplink Transmission in Multi-Carrier when Gaps are Configured

According to one embodiment of the present invention, rules related to uplink transmissions on PCell and SCell(s) in multi-carrier when gaps are configured can be pre-defined.

In one embodiment, it may be pre-defined for both FDD and TDD that when a UE is configured with at least one SCell and also configured with measurement gaps for performing a measurement on a cell, then the UE shall not transmit in the uplink on one of the configured PCell and SCell(s) during the measurement gaps. The cell (PCell or SCell) on which the UE does not transmit in the uplink is linked or associated with a DL cell on which the gaps (e.g., network configured or UE autonomous gaps) are configured. The cell on which the gaps are configured or created by the UE is based on a pre-defined rule or indication received by the UE from the network. For TDD the subframe on which the UE shall not transmit in the uplink can be uplink subframe or a special subframe. For FDD the subframe on which the UE shall not transmit in the uplink can be only uplink subframe.

In one embodiment it may be pre-defined specifically for TDD that when a UE is configured with at least one SCell and also configured with measurement gaps for performing a measurement on a cell, and the subframe immediately before the measurement gap is a DL subframe, then the UE shall not transmit in the uplink on one of the configured PCell and SCell(s) during the configured measurement gap and in one uplink subframe which occurs immediately after the configured measurement gap. The cell (PCell or SCell) on which the UE does not transmit in the uplink is linked or associated with a DL cell on which the gaps (e.g. network configured or UE autonomous gaps) are configured. The cell on which the gaps are configured or created by the UE is based on a pre-defined rule or indication received by the UE from the network.

In another embodiment it may be pre-defined that when a UE is configured with at least one SCell and also configured with measurement gaps for performing a measurement on a cell, then the UE shall not transmit in the uplink on at least one of the configured PCell and SCell(s) during the measurement gaps. The cell (PCell or SCell) on which the UE is allowed to transmit in the uplink is linked or associated with a DL cell on which the gaps (e.g. network configured or UE autonomous gaps) are NOT configured. For TDD the subframe on which the UE is allowed to transmit in the uplink can be uplink subframe or a special subframe. For FDD the subframe on which the UE is allowed to transmit in the uplink can be only uplink subframe.

In these embodiments the uplink cell on which the UE is allowed to transmit during the measurement gap may also depend on an indication received from the network, pre-defined rule, or suitable criteria. For example it may be pre-defined that the above rule is applicable only for certain type of carrier aggregation, e.g., inter-band carrier aggregation, intra-band non-contiguous CA. In another embodiment it may be pre-defined that the above rule is applicable only if UE has certain radio transceiver architecture or characteristics (e.g., receiver and/or transmitter architecture or characteristics) for carrier aggregation, e.g., multiple radio chains for each cell, independent radio chains for each set of cell on each band, or on each set of contiguous carriers.

Capability to Perform Feedback Signaling on Alternative Serving Cell

According to one embodiment the UE reports to the network its capability of sending the feedback signaling on an alternative cell. If a UE is capable of sending feedback signaling on an alternative serving cell, the UE will be able to, during measurement gaps, send feedback signaling on a backup feedback serving cell other than the normal feedback serving cell. For example, a UE is sending the feedback signaling (e.g. PUCCH containing ACK/NACKs, CSI (CQI, PMI, RI, PCI etc.), uplink and/or downlink measurements, buffer status, satisfaction level with respect to current grant, etc.) on the PCell. When a measurement gap is performed on the PCell the UE would, if it was capable of sending feedback signaling on an alternative serving cell, send the ACK/NACKs, CQI, RI, etc. on an active SCell on which there is currently no measurement gap performed.

The UE capability may additionally state details such as if the UE is capable of performing selection of a backup feedback cell. A low-complexity UE might not have implemented such a selection mechanism and may therefore need to rely on, for example, predefined rules for selecting backup feedback cell, while a high-complexity UE might be able to exploit information which is useful in backup feedback cell selection. Another capability communicated to the network is details about in which way the UE is capable to send the feedback signaling on the backup feedback cell. It might for example be that one UE is only able to send the feedback signaling on the PUSCH, while another UE might also be able to keep multiple PUCCH configurations, and therefore can send the feedback signaling on a backup feedback cell's PUCCH channel.

The acquired capability information may be used by the network when determining how frequently measurement gaps should be configured, if a backup feedback cell needs to be selected by the network and signaled to the UE, if DL transmissions to the UE should be performed when measurement gaps are performed, etc.

The UE may send the capability information to the network node in several ways. In one embodiment, the UE may report upon receiving an explicit request from the network node (e.g. serving or any target network node). The explicit request can be sent to the UE by the network anytime or at any specific occasion. For example the request for the capability reporting can be sent to the UE during initial setup or after a cell change (e.g. handover, RRC connection re-establishment, RRC connection release with redirection, PCell change in CA, PCC change in PCC etc.).

Alternatively, the UE may engage in proactive reporting without receiving any explicit request from the network node (e.g. serving or any target network node). In this case, the UE may report its capability during one or more of the following occasions: during initial setup or call setup e.g. when establishing the RRC connection; during cell change, e.g., handover, primary carrier change in multi-carrier operation, PCell change in multi-carrier operation, RRC re-establishment, RRC connection release with redirection, etc.

Sending Scheduling Information on an Available Alternative Cell

According to one embodiment the network sends scheduling information for a cell on a backup scheduling serving cell when a measurement gap is performed on the normal scheduling cell. For example, if scheduling information for a cell A is under normal conditions sent on cell X but the UE is currently performing a measurement by creating measurement gaps on cell X, the network could instead send the scheduling information on an alternative scheduling cell Y. In this example the normal scheduling cell for cell A is cell X and backup or alternative scheduling cell is cell Y.

Selectively Sending Scheduling Information on the Backup Scheduling Cell

According to one embodiment a selection is made of which scheduling information for a scheduled cell should be carried on a backup scheduling cell. The backup scheduling cell refers to a cell on which the network, when a UE is configured with at least one SCell, sends scheduling information for a scheduled cell to a UE while the UE is not allowed to or able to receive in the downlink on the normal scheduling cell. Because a UE is not able to receive the downlink on the normal scheduling cell for the scheduled cell, at least part of the scheduling information for the scheduled cell cannot be received by the UE on the normal scheduling cell in subframes during the measurement gap rendering the scheduled cell unusable for this UE.

In some scenarios only a subset of the scheduling information for the scheduled cell is sent on the backup scheduling cell when the normal scheduling cell is not available. The scheduling information for the scheduled cell which should be sent on the backup scheduling cell can be decided by the network. For example the network might only send DL assignments on an alternative scheduling cell while UL grants are not sent.

Selection of Alternative Scheduling Cell(s) for Scheduling Information Signaling One possible scenario is that the UL grants and the DL assignments for a UE for a scheduled cell are carried on different scheduling cells. In this case, it may be that a scheduled cell has two scheduling cells and only one of these is unavailable. It also means that the network can, for a UE, select different backup scheduling cells for one scheduled cell and these scheduling cells carry different scheduling information, e.g., one serving cell is scheduling the scheduled serving cell in UL and another serving cell is scheduling the scheduled serving cell in DL. If this is the case and only one of the scheduling serving cells are unavailable, the network may only select to use a backup scheduling serving cell for the scheduling serving cell which currently is not available.

According to one embodiment a selection of which active serving cell(s) should be used for sending the scheduling information is made, i.e., the backup scheduling serving cell for the scheduled serving cell on which the network sends the scheduling information during the measurement gap. In a situation where a UE is configured and has activated multiple potential backup scheduling serving cells for the scheduled serving cell when the normal scheduling serving cell is unavailable, then one (or more) of those scheduling serving cells should be selected to be used for signaling of scheduling information.

The network node can make this selection based on one or more criteria as listed below.

Bandwidth of alternative cells—This rule is based on the bandwidth of the alternative serving cells. An example rule taking bandwidth as input to the selection is that the available serving cell with the largest bandwidth is used for scheduling information signaling. A benefit with selecting the cell with the larges bandwidth for signaling of scheduling information is that the UE uses the serving cell which has most bandwidth resources and therefore could, in theory, carry most traffic. Another example is that the cell with the smallest bandwidth is used as backup scheduling cell for the scheduled cell.

Cell index—This rule is based on the cell index of the alternative serving cells. An example rule taking cell index as input to the selection is that the cell with the available cell with the highest cell index cell index is used for signaling of scheduling information for the scheduled cell. Another example is that the available cell with the lowest cell index is used as backup scheduling cell. Because the cell index of a serving cell does not have any correlation to the characteristics of the cell, this rule can also be considered as a random cell selection rule.

Number of active UEs—The eNB bases the decision for selecting the backup serving cell on the number of active UEs. For example, the eNB might select to send scheduling information to a UE on the serving cell available to the UE which has fewest number of active UEs.

Carrier frequency—This rule is based on the carrier frequency of the alternative serving cells. An example rule taking carrier frequency as input to the selection is that the available cell with the lowest carrier frequency is used for scheduling information signaling. A benefit with selecting the cell with the lowest carrier frequency for scheduling information signaling is that the UE uses the serving cell which, in general, has the highest path gain as path gain is higher at low carrier frequencies. With high path gain the transmission will be more reliable and the network node will be able to receive it more easily (e.g. with fewer errors, with less uplink power, etc.).

Radio conditions—A cell whose radio conditions (e.g. SINR, SNR, BLER etc.) is above a threshold is selected. In case more than one cell meets the criteria then the network may select the one with best quality. This will ensure that the signaling is received without error or without minimum errors.

Cell load—A cell on which there is least amount of data to be transmitted is selected for sending the scheduling information signaling. This will distribute load of uplink transmission on different cells.

Association with feedback signaling type—It may also be pre-defined that the cell on which the scheduling information signaling is to be sent depends upon the type and/or contents of scheduling information signaling. For example DL assignments and UL grants may be sent on different cells.

Hardware and Software

Figure 6:
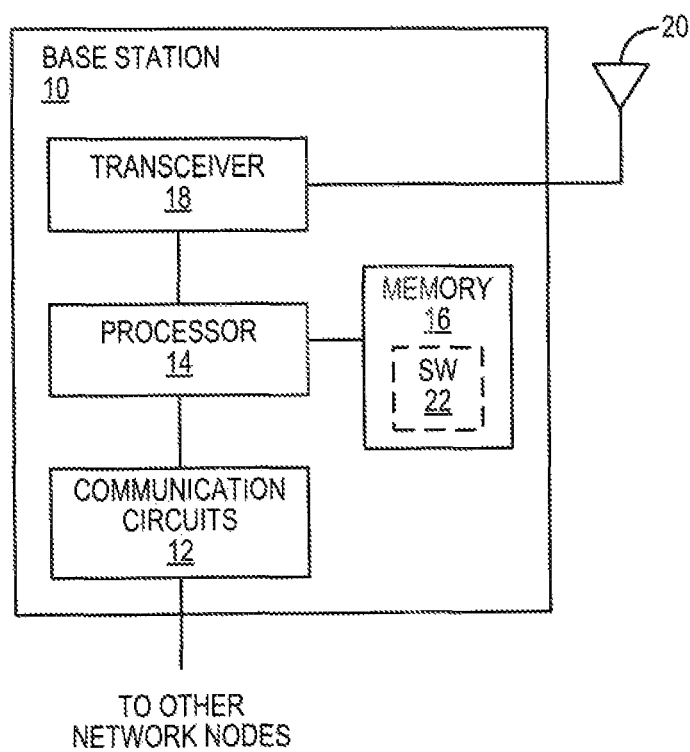
FIG. 6 is a functional block diagram of a base station.

FIG. 6 depicts a base station 10 operative in embodiments of the present invention. As those of skill in the art are aware, a base station 10 is a network node providing wireless communication services to one or more UE in a geographic region (known as a cell or sector, not to be confused with the term cell used herein to refer to component carriers in CA). The base station 10 in LTE is called an e-NodeB or eNB; however the present invention is not limited to LTE or eNBs. A base station 10 includes communication circuitry 12 operative to exchange data with other network nodes; a processor 14; memory 16; and radio circuitry, such as a transceiver 18, one or more antennas 20, and the like, to effect wireless communication across an air interface to one or more UE. According to embodiments of the present invention, the memory 16 is operative to store, and the processor 14 operative to execute, software 22 which when executed is operative to cause the base station 10 to perform methods and functions described herein.

Figure 7:
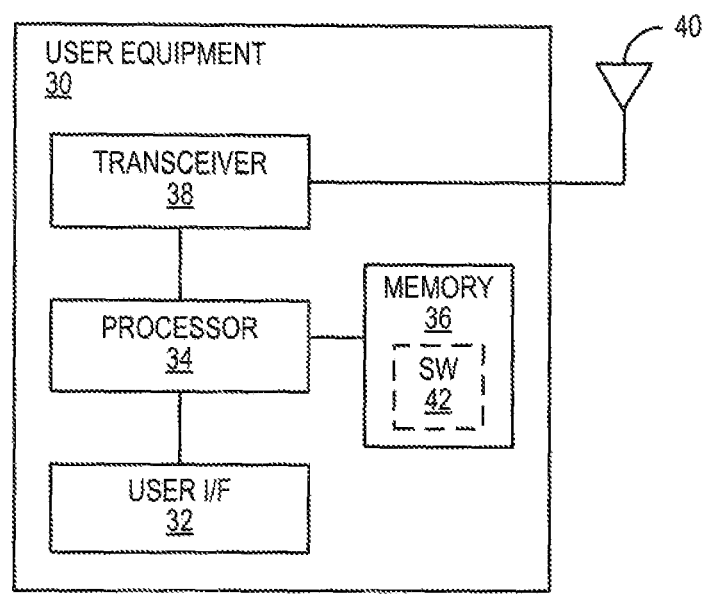
FIG. 7 is a functional block diagram of a UE.

FIG. 7 depicts a UE 30 operative in embodiments of the present invention. As those of skill in the art are aware, a UE 30 is a device, which may be battery-powered and hence mobile, operative within a wireless communication network. The UE 30 includes a user interface 32 (display, touchscreen, keyboard or keypad, microphone, speaker, and the like); a processor 34; memory 36; and a radio circuitry, such as one or more transceivers 38, antennas 40, and the like, to effect wireless communication across an air interface to one or more base stations 10. The UE 30 may additionally include features such as a camera, removable memory interface, short-range communication interface (Wi-Fi, Bluetooth, and the like), wired interface (USB), and the like (not shown in FIG. 7). According to embodiments of the present invention, the memory 36 is operative to store, and the processor 34 operative to execute, software 42 which when executed is operative to cause the UE 30 to perform methods and functions described herein In all embodiments, the processor 14, 34 may comprise any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

In all embodiments, the memory 16, 36 may comprise any non-transient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the radio circuitry may comprise one or more transceivers 18, 38 used to communicate with one or more other transceivers 18, 38 via a Radio Access Network according to one or more communication protocols known in the art or that may be developed, such as IEEE 802.xx, CDMA, WCDMA, GSM, LTE, UTRAN, WiMax, or the like. The transceiver 18, 38 implements transmitter and receiver functionality appropriate to the Radio Access Network links (e.g., frequency allocations and the like). The transmitter and receiver functions may share circuit components and/or software, or alternatively may be implemented separately. In particular, a UE 30 according to embodiments of the present invention may include a transceiver 38 having two or more sets of receiver circuits and/or two or more sets of transmitter circuits, each independently tunable to a different CC frequency. When feedback signaling is required to be transmitted to the a first network, if a first set of transceiver circuits normally allocated to a CC on the first network are unavailable, such as due to the UE 30 performing measurements on another frequency or RAT, a second set of transceiver circuits may be employed to transmit the feedback signaling to an alternative CC.

In all embodiments, the communication circuitry 12 may comprise a receiver and transmitter interface used to communicate with one or more other nodes over a communication network according to one or more communication protocols known in the art or that may be developed, such as Ethernet, TCP/IP, SONET, ATM, or the like. The communication circuitry 12 implements receiver and transmitter functionality appropriate to the communication network links (e.g., optical, electrical, and the like). The transmitter and receiver functions may share circuit components and/or software, or alternatively may be implemented separately.

Advantages of Embodiments of the Present Invention

According to embodiments of the present invention, a UE will be able to send feedback signaling to the network even though the cell on which feedback signaling normally is sent it currently unavailable due to, for example, a measurement gap being performed.

Certain feedback signaling is critical for the workability of a UE such as ACK/NACK transmission. If the UE cannot send ACK/NACKs in UL then the DL cannot be received. The PUCCH is contained on a UE's PCell and in case the UE is configured to send ACK/NACKs on the PUCCH, a measurement gap performed on a UE's PCell will render DL reception for that UE impossible.

Measurement gaps can be as long as two seconds, which is a very long time in the context of LTE. This means that it is critical to be able to send ACK/NACKs, also during measurement gaps.

According to embodiments of the present invention, throughput losses due to unavailability of the cell configured for feedbacks signaling will be reduced.

According to embodiments of the present invention, the eNB is able to schedule a UE even though the cell on which scheduling information is sent, is unavailable to the UE, for example due to a measurement gap. This capability is very important so as to be able to continue UL and DL traffic also when the scheduling cell is unavailable.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of sending feedback signaling by User Equipment, UE, operative in a multi-carrier wireless communication network, the UE being configured with one primary component carrier and one or more secondary component carriers, comprising: sending feedback signaling to the network on the primary feedback carrier; and in a duration in which the UE is unable to send feedback signaling to the network on the primary component carrier, sending at least some of the feedback signaling to the network on one or more secondary component carriers.

2. The method of claim 1 wherein a secondary component carrier is within the same Radio Access Technology and frequency band as the primary component carrier.

3. The method of claim 1 wherein a secondary component carrier is within the same Radio Access Technology but a different frequency band as the primary component carrier.

4. The method of claim 1 wherein a secondary component carrier is in a different Radio Access Technology than the primary component carrier.

5. The method of claim 1 wherein the duration in which the UE is unable to send feedback signaling to the network on the primary feedback carrier is a measurement gap.

6. The method of claim 5 wherein the measurement gap is configured by the network.

7. The method of claim 5 wherein the measurement gap is determined by the UE autonomously from the network.

8. The method of claim 1 wherein sending at least some of the feedback signaling to the network on one or more secondary component carriers comprises multiplexing the feedback signaling with data signaling on the one or more secondary component carriers.

9. The method of claim 1 wherein sending at least some of the feedback signaling to the network on one or more secondary component carriers comprises sending the feedback signaling on a control channel of the one or more secondary component carriers.

10. The method of claim 1, further comprising selecting one or more secondary component carriers on which to send feedback signaling.

11. The method of claim 10 wherein selecting one or more secondary component carriers on which to send feedback signaling comprises selecting one or more secondary component carriers according to a pre-defined rule.

12. The method of claim 10 further comprising: receiving from the network an indication of which one or more secondary component carriers to utilize for sending feedback signaling when the UE is unable to send feedback signaling to the network on the primary feedback carrier; and wherein selecting one or more secondary component carriers on which to send feedback signaling comprises selecting one or more secondary component carriers according to the indication received from the network.

13. The method of claim 1, further comprising determining a subset of available feedback signaling to send on the secondary component carrier.

14. The method of claim 13 wherein determining a subset of available feedback signaling to send on the secondary component carrier comprises determining a subset according to a pre-defined rule.

15. The method of claim 13 further comprising: receiving from the network an indication of the subset of available feedback signaling to send on the secondary component carrier when the UE is unable to send feedback signaling to the network on the primary feedback carrier; and wherein determining a subset of available feedback signaling to send comprises determining the subset of available feedback signaling to send according to the indication received from the network.

16. The method of claim 1 further comprising, prior to the duration in which the UE is unable to send feedback signaling to the network on the primary feedback carrier, sending to the network an indication of the capability of the UE to select one or more secondary component carriers on which to send feedback signaling.

17. The method of claim 16 wherein sending the indication to the network is done in response to a receiving a request for such indication from the network.

18. A method of transmitting uplink signaling by User Equipment, UE, operative in a multi-carrier wireless communication network, the UE being configured with two or more component carriers, comprising: receiving from the network a configuration to perform a measurement gap on a downlink component carrier; during the measurement gap, not transmitting any uplink signaling on an uplink component carrier associated with the downlink component carrier on which the measurement gap is configured; and during the measurement gap, transmitting the uplink signaling on an uplink component carrier that is not associated with the downlink component carrier on which the measurement gap is configured.

19. The method of claim 18, wherein the network operates in Time Division Duplex, further comprising, following the measurement gap, not transmitting any uplink signaling on the uplink component carrier associated with the downlink component carrier on which a measurement gap is configured during an uplink subframe immediately following the measurement gap.

20. The method of claim 18 wherein the uplink component carrier selected for transmitting the uplink signaling is selected on the basis of the bandwidth of alternative cells.

21. The method of claim 18 wherein the uplink component carrier selected for transmitting the uplink signaling is selected on the basis of a cell index associated with each potential uplink component carrier.

22. The method of claim 18 wherein the uplink component carrier selected for transmitting the uplink signaling is selected on the basis of radio conditions experienced by the uplink component carrier.

23. The method of claim 18 wherein the uplink component carrier selected for transmitting the uplink signaling is selected on the basis of a cell load on the uplink component carrier.

24. The method of claim 18 wherein the uplink component carrier selected for transmitting the uplink signaling is selected on the basis of the type and/or contents of feedback signaling.

25. The method of claim 18 wherein the uplink component carrier selected for transmitting the uplink signaling is selected on the basis of the size of an available grant.

26. A method of receiving scheduling information by User Equipment, UE, operative in a multi-carrier wireless communication network, the UE being configured with a first scheduling component carrier and at least a second scheduling component carrier, comprising, receiving scheduling information from the network on a first scheduling component carrier; and in a duration in which the UE is unable to receiving scheduling information from the network on the first scheduling component carrier, receiving scheduling information from the network on a second scheduling component carrier.

27. The method of claim 26 wherein the scheduling information received from the network regards transmissions to or from the UE on a third component carrier.

28. A method, by a serving network node operative in a wireless communication network, of receiving feedback signaling from User Equipment, UE, comprising: configuring the UE for operation on one primary component carrier and one or more secondary component carriers; in a duration in which the UE is unable to send feedback signaling to the network on the primary component carrier, receiving at least some of the feedback signaling from the UE on one or more secondary component carriers.

29. The method of claim 28 wherein the duration in which the UE is unable to send feedback signaling to the network on the primary feedback carrier is a measurement gap.

30. The method of claim 29, further comprising configuring the UE to perform a measurement gap on the primary component carrier.

31. The method of claim 28, further comprising indicating to the UE on which secondary component carrier to send feedback signaling.

32. The method of claim 28, further comprising receiving from the UE an indication of which secondary component carrier will be used to send the feedback signaling.

33. The method of claim 28, further comprising indicating to the UE a subset of feedback signaling to send.

34. The method of claim 28, further comprising receiving from the UE an indication of a subset of feedback signaling that will be sent.

35. The method of claim 28, further comprising indicating to the UE whether to multiplex the feedback signaling with data signaling on the secondary carrier or to send the feedback signaling on a control channel of the secondary carrier.

36. The method of claim 28, further comprising receiving from the UE an indication of whether the UE will multiplex the feedback signaling with data signaling on the secondary carrier or will send the feedback signaling on a control channel of the secondary carrier.

37. The method of claim 28 further comprising, prior to the duration in which the UE is unable to send feedback signaling to the network on the primary feedback carrier, receiving from the UE an indication of the capability of the UE to select one or more secondary component carriers on which to send feedback signaling.

38. The method of claim 37, further comprising sending to the UE a request for the UE selection capability indication.

39. User Equipment, UE, operative in a multi-carrier wireless communication network, comprising: a transceiver operative to exchange signaling with a network node on at least a primary component carrier and one or more secondary component carriers; memory; and a processor operatively connected to the memory and further operative to send feedback signaling to the network on the primary feedback carrier; and in a duration in which the UE is unable to send feedback signaling to the network on the primary component carrier, send at least some of the feedback signaling to the network on one or more secondary component carriers.

40. The method of claim 39 wherein the duration in which the UE is unable to send feedback signaling to the network on the primary feedback carrier is a measurement gap, and wherein the processor is further operative to determine the measurement gap autonomously from the network.

41. The method of claim 39 wherein the processor is further operative to select one or more secondary component carriers on which to send feedback signaling.

42. The method of claim 41 wherein the processor is operative to select one or more secondary component carriers on which to send feedback signaling according to a pre-defined rule.

43. The method of claim 41 wherein the processor is operative to select one or more secondary component carriers on which to send feedback according to a selection indication received from the network.

44. A base station operative in a multi-carrier wireless communication network, comprising: a transceiver operative to exchange signaling with a User Equipment, UE, on at least a primary component carrier and one or more secondary component carriers; memory; and a processor operatively connected to the memory and further operative to configure the UE for operation on one primary component carrier and one or more secondary component carriers; and in a duration in which the UE is unable to send feedback signaling to the network on the primary component carrier, receive at least some of the feedback signaling from the UE on one or more secondary component carriers.

45. The method of claim 44 wherein the duration in which the UE is unable to send feedback signaling to the network on the primary feedback carrier is a measurement gap, and wherein the processor is further operative to configure the measurement gap for the UE.

46. The method of claim 44 wherein the processor is further operative to select one or more secondary component carriers on which the UE should send feedback signaling.

47. The method of claim 46 wherein the processor is operative to select one or more secondary component carriers on which the UE should send feedback signaling according to a pre-defined rule.

* * * * *